(12) United States Patent
Nagy

(10) Patent No.: US 9,494,450 B2
(45) Date of Patent: Nov. 15, 2016

(54) METHOD FOR CALIBRATING A TRIGGER UNIT AND CASCADABLE SENSOR THEREFOR

(71) Applicant: Kapsch TrafficCom AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 408 days.

(21) Appl. No.: 14/266,246

(22) Filed: Apr. 30, 2014

(65) Prior Publication Data

US 2014/0331736 A1    Nov. 13, 2014

(30) Foreign Application Priority Data

May 13, 2013  (EP) .................................... 13167408

(51) Int. Cl.
  *G01S 7/40*  (2006.01)
  *G01S 7/00*  (2006.01)
  *G01D 18/00*  (2006.01)
  *G01S 13/87*  (2006.01)

(52) U.S. Cl.
  CPC .............. *G01D 18/00* (2013.01); *G01S 7/003* (2013.01); *G01S 7/40* (2013.01); *G01S 7/4008* (2013.01); *G01S 7/4021* (2013.01); *G01S 13/87* (2013.01)

(58) Field of Classification Search
  CPC ........... G01D 18/00; G01S 7/003; G01S 7/40; G01S 7/4008; G01S 7/4018; G01S 7/4021; G01S 13/87
  USPC ....................................................... 342/165
  See application file for complete search history.

(56) References Cited

U.S. PATENT DOCUMENTS

| | | | | |
|---|---|---|---|---|
| 4,234,940 A | * | 11/1980 | Iinuma ............... | G01N 29/0609 342/375 |
| 5,084,708 A | * | 1/1992 | Champeau ........... | H01Q 3/2682 342/375 |
| 5,808,580 A | * | 9/1998 | Andrews, Jr. ......... | G01S 13/582 342/108 |
| 5,940,025 A | * | 8/1999 | Koehnke ................. | G01S 7/282 330/2 |

(Continued)

FOREIGN PATENT DOCUMENTS

| | | |
|---|---|---|
| DE | 19740306 A1 | 3/1999 |
| DE | 10004425 A1 | 1/2002 |

(Continued)

OTHER PUBLICATIONS

Extended European Search Report received for EP Patent No. 13167408.7, mailed on Oct. 25, 2013, 6 pages.

*Primary Examiner* — Peter Bythrow
(74) *Attorney, Agent, or Firm* — Fiala & Weaver, P.L.L.C.

(57) ABSTRACT

A method is disclosed for calibrating a trigger unit which is connected via a trigger line to at least two sensors configured to be triggered. Each sensor is connected between two successive line portions of the trigger line. Each sensor has an input and an output, a controllable interrupter between the input and output; and a control circuit, which controls the interrupter. The interrupters of all sensors are initially open. The method comprises the following: transmitting a trigger pulse; in the sensor: receiving the trigger pulse and returning a response; in the trigger unit: receiving the response and calibrating the trigger unit; repeating the aforementioned steps, wherein each sensor reflects the trigger pulse, and the trigger unit measures the propagation times and is calibrated thereto.

11 Claims, 2 Drawing Sheets

(56) References Cited

U.S. PATENT DOCUMENTS

Figure 1:
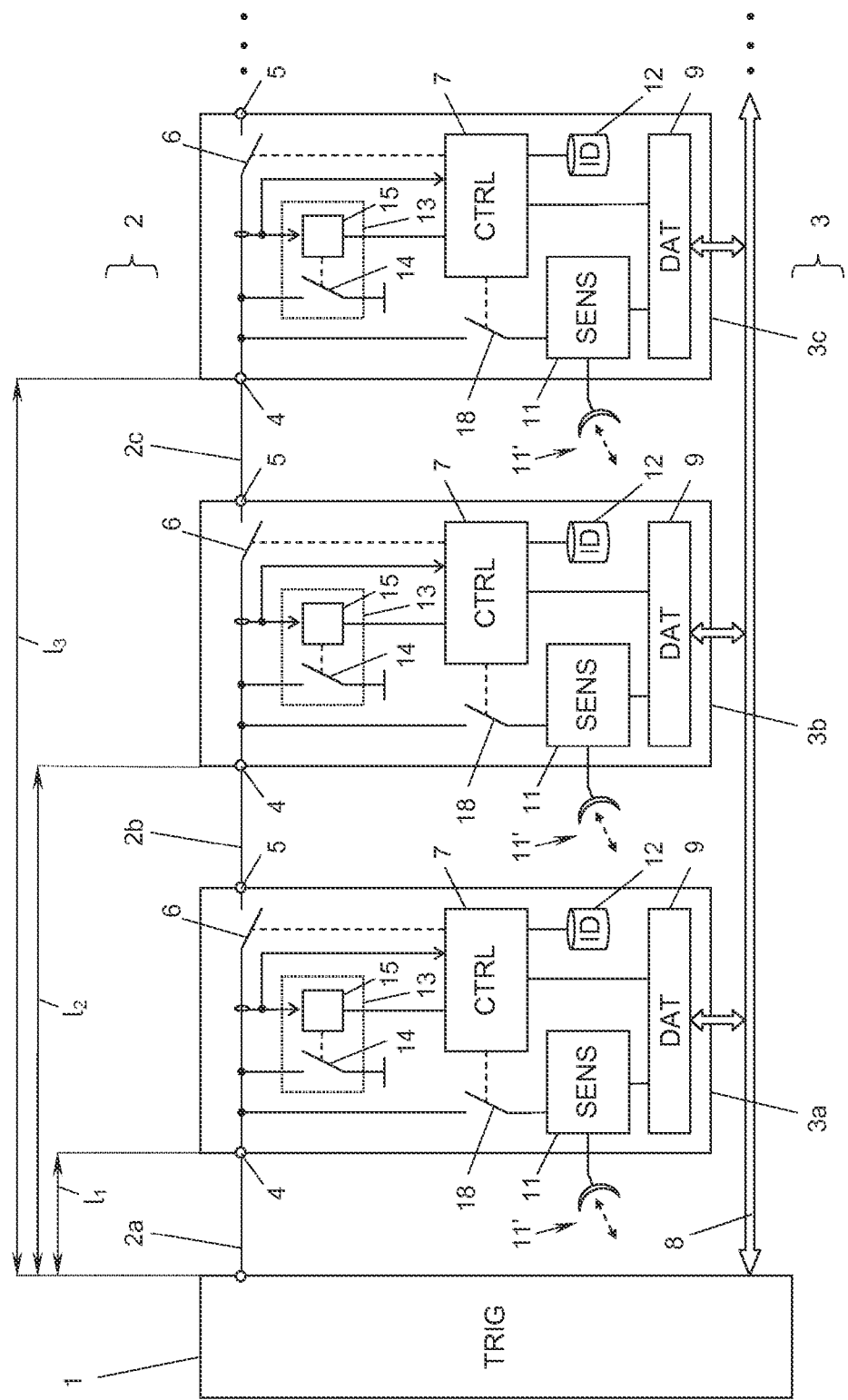

| | | | |
|---|---|---|---|
| 6,232,910 B1 * | 5/2001 | Bell | B60Q 1/0023 |
| | | | 342/104 |
| 6,252,542 B1 * | 6/2001 | Sikina | H01Q 3/267 |
| | | | 342/174 |
| 6,895,230 B1 * | 5/2005 | Blount | H04B 7/084 |
| | | | 342/174 |
| 6,989,788 B2 * | 1/2006 | Marion | H01P 1/185 |
| | | | 333/164 |
| 7,649,492 B2 * | 1/2010 | Wilens | H03K 5/14 |
| | | | 327/262 |
| 8,102,785 B2 * | 1/2012 | Rao | H01Q 3/267 |
| | | | 370/278 |
| 9,360,549 B1 * | 6/2016 | Liu | H01Q 3/267 |
| 2006/0013065 A1 | 1/2006 | Varsamis et al. | |
| 2008/0252524 A1 * | 10/2008 | Chu | H01Q 3/2682 |
| | | | 342/375 |
| 2010/0283659 A1 * | 11/2010 | Huggett | G01S 7/285 |
| | | | 342/20 |
| 2011/0273325 A1 * | 11/2011 | Goldman | G01S 3/46 |
| | | | 342/146 |

FOREIGN PATENT DOCUMENTS

| | | |
|---|---|---|
| DE | 102005055964 A1 | 5/2007 |
| DE | 102007045561 A1 | 4/2009 |
| DE | 102008034445 A1 | 2/2010 |

\* cited by examiner

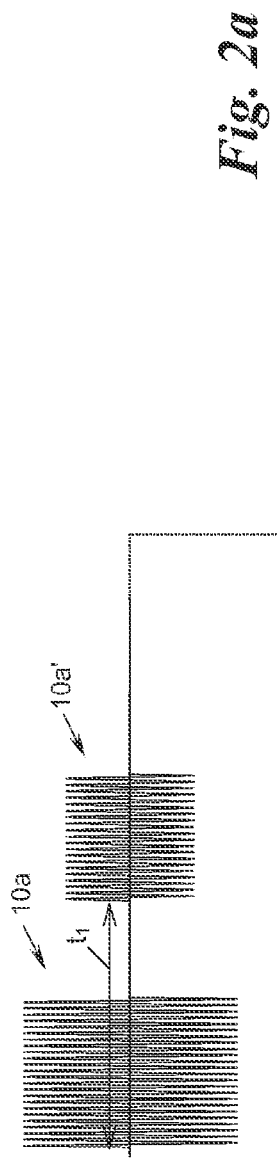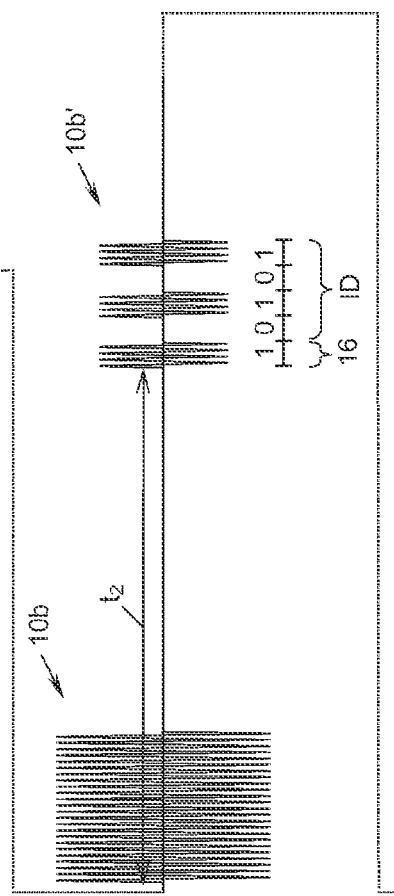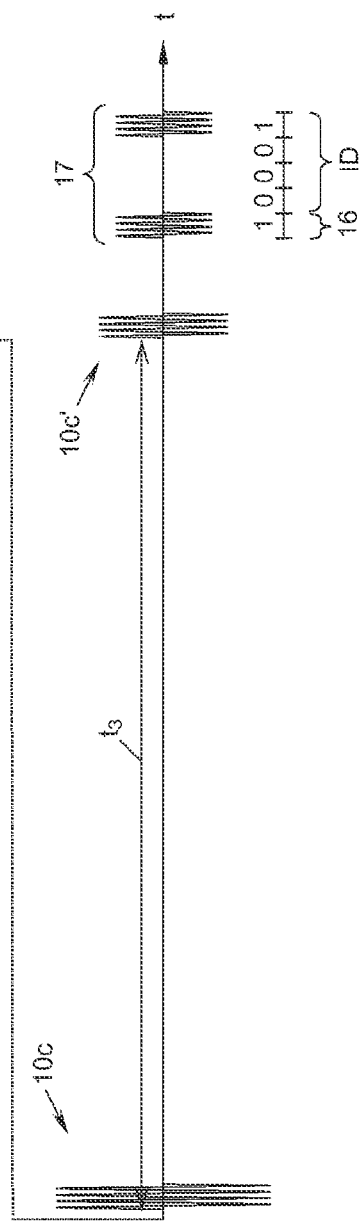

METHOD FOR CALIBRATING A TRIGGER UNIT AND CASCADABLE SENSOR THEREFOR

CROSS-REFERENCE TO RELATED APPLICATION(S)

This application claims priority to European Patent Application No. 13 167 408.7, filed on May 13, 2013, the entirety of which is incorporated by reference herein.

BACKGROUND

1. Technical Field

The present subject matter relates to a method for calibrating a trigger unit which is connected via a trigger line to at least two sensors that can be triggered, each sensor being connected between two successive line portions of the trigger line, wherein each sensor has an input for one line portion of the trigger line and an output for the other line portion of the trigger line, a controllable interrupter between the input and output, and a control circuit connected to the input and controlling the interrupter, wherein the interrupters of all sensors are initially open. The present subject matter also relates to a sensor for such a method.

2. Background Art

A number of spatially distributed sensors are frequently used in measuring systems, for example in order to record object scenes multi-dimensionally. If a number of sensors on a trigger line are to be triggered, that is to say activated, simultaneously by a common trigger signal, the propagation time of the trigger signal over the trigger line thus changes the actual trigger point of each sensor and is to be taken into consideration with time-critical measurements, for example with propagation time measurements. Besides the line length, the propagation time over the trigger line is also dependent on temperature fluctuations and signs of aging, and therefore a highly accurate measurement of the propagation time of the trigger signal, if this only occurs once, leads to just limited accuracy however.

Spatially distributed transmitters and receivers of a radar system which are coupled to one another in order to carry out a multi-dimensional sampling procedure are known from EP 1 570 291 B1 under the term "multistatic sensor systems". The radar transmitters and receivers are coupled in this case with the aid of a signal generator for each of the transmitters and receivers with adaptable clock signals of frequencies which deviate slightly from one another and which are transmitted via a common signal line. The signal line is formed in bus topology with branches to each sensor. Here, the sequence of the largely structurally identical sensors on the trigger or signal line must be known for correct assignment of the measured data; it is generally programmed manually for this purpose following the establishment of the system or a sensor replacement, which is complex and additionally susceptible to faults.

The document DE 097 40 306 A1 describes a method for initialization of a bus system with an additional initialization line on which bus modules are connected in a cascade. To initialize a bus master, at first each bus module disconnects the initialization line to the bus module following in the cascade; the bus master then enquires about a device identifier of the last accessible bus module in the cascade, which, after the inquiry, unblocks the initialization line to the module following in the cascade and thereby the bus master progressively determines the sequence of the bus modules on the trigger line.

BRIEF SUMMARY

An object of the present subject matter is to create a method for calibrating a trigger unit and also a sensor suitable therefor, which can be more easily handled and is less susceptible to faults than with known multisensor systems and can automatically recognise signal propagation times.

The object is achieved in a first aspect of the present subject matter with a method of the type mentioned above, said method comprising the following steps:

transmitting a trigger pulse from the trigger unit via at least one line portion to a sensor;

in the sensor: receiving the trigger pulse and, if the interrupter switch is open, returning a response to the trigger unit and closing the interrupter switch;

in the trigger unit: receiving the response and calibrating the trigger unit to the sensor on the basis of the received response;

repeating the aforementioned steps for each further sensor until the trigger unit no longer receives a response to a trigger pulse or a maximum, pre-set number of transmitted trigger pulses has been reached;

wherein each sensor reflects the trigger pulse as a response, and the trigger unit measures the propagation times of the trigger pulses transmitted and then reflected by the respective sensors and is calibrated thereto.

By connecting the sensors via their inputs and outputs in the form of a cascade between individual line portions of the trigger line in conjunction with the initially open interrupters, which only close step-by-step, in the sensors, the trigger unit can address each sensor individually in the calibration mode and can be calibrated thereto. Neither the order of the sensors on the trigger line nor the number thereof has to be known beforehand; each sensor is addressed unambiguously in that it receives a trigger pulse when the interrupter is open. By means of the reflected trigger pulse, in the calibration mode the propagation times over the trigger line are further ascertained quite easily. The cumulated lengths of the line portions can also be determined on the basis of the ascertained propagation times, which is only necessary however if the trigger unit does not take into account the propagation times directly.

In accordance with the method for calibration, the calibration to line lengths or propagation times can be combined in each step with the calibration to the order of identified sensors. To this end, it is particularly advantageous if each sensor has an unambiguous identification and modulates the reflected trigger pulse with its identification, and the trigger unit identifies the order of the sensors on the trigger line on the basis of the sequence of the incoming identifications and is also calibrated thereto. Such a modulation can be implemented by a passive modulator, which does not require its own energy supply or its own energy store, but merely reflects the energy of the transmitted trigger pulse. Further, there is no need in this embodiment for a separate data bus for identification of the sensors.

In an alternative embodiment, each sensor has an unambiguous identification and, following the reflected trigger pulse, also returns an identification pulse modulated with its identification, and the trigger unit identifies the order of the sensors on the trigger line on the basis of the sequence of the incoming identifications and is also calibrated thereto. Such an identification pulse returned actively by the sensor may also have a much greater power than a mere reflection, whereby it is possible to compensate for line losses or coupled-in interferences, in particular with large line lengths. The duration of such an identification pulse is also independent of the duration of the trigger pulse; a very short trigger pulse is sufficient, which specifically with short line lengths helps to avoid collisions between transmitted and reflected trigger pulses, wherein long identifications can still also be returned. In this case too, there is no need for a separate data bus for identification of the sensors.

In accordance with a further alternative embodiment, it is advantageous if each sensor has an unambiguous identification, and, following the reflected trigger pulse, if the identification is also returned via a data bus to the trigger unit and the trigger unit identifies the order of the sensors on the trigger line on the basis of the sequence of the incoming identifications and is calibrated thereto. This embodiment is particularly suitable if a data bus is provided in any case. Since the identification in this case is no longer transmitted via the trigger line, the trigger line is relieved and the entire method for calibration can be performed more quickly and more efficiently.

In a second aspect the present subject matter creates a cascadable sensor, which can be connected via an input and an output between two line portions of a trigger line and comprises:

a sensor circuit that can be triggered, a controllable interrupter between the input and output, and a control circuit connected to the input and controlling the interrupter, wherein the control circuit is configured in a calibration mode: to initially open the interrupter and, once a first trigger pulse has been received at the input, to output a response at the input and to close the interrupter; and in an operating mode: to apply a trigger pulse, received at the input, to the sensor circuit;

further comprising a memory with an unambiguous identification and a modulator connected to the input, wherein the control circuit is configured to return, as a response in the calibration mode, an identification pulse modulated with the identification with the aid of the modulator.

Such a sensor can be cascaded in any order with other sensors having these features. Reference is made to the previous embodiments of the method with respect to further advantages of the sensor.

If the propagation time of a trigger pulse over the trigger line or length thereof is to be determined, the sensor thus may further comprise a reflector at the input, said reflector being switchable by the control circuit, wherein the control circuit is configured to reflect the trigger pulse at the input as a response in the calibration mode. It is particularly favourable if the reflector is formed here by the interrupter in the open state. A further component controlled if need be by the control circuit can thus be omitted. The sensor structure is simpler, more cost effective and less susceptible to faults.

It is particularly advantageous if the sensor further comprises a memory with an unambiguous identification and a modulator connected to the input, wherein the control circuit is configured to modulate the reflected trigger pulse with the identification with the aid of the modulator. In an alternative embodiment the sensor comprises a memory with an unambiguous identification and a modulator connected to the input, wherein the control circuit is configured, following the reflected trigger pulse, to also return an identification pulse modulated with the identification with the aid of the modulator. In a further alternative embodiment the sensor comprises a memory with an unambiguous identification, wherein the control circuit is configured, following the reflected trigger pulse, to also output the identification at the data bus connection.

The triggerable sensor circuit of the sensor may, for example, be of any type as currently known. The sensor circuit may, for example, be a radar sensor circuit. Such a sensor circuit is particularly suitable for multistatic sensor systems and may contain either radar transmitters or radar receivers or both.

Further features and advantages, as well as the structure and operation of various embodiments, are described in detail below with reference to the accompanying drawings.

BRIEF DESCRIPTION OF THE DRAWINGS/FIGURES

The present subject matter will be explained in greater detail hereinafter on the basis of exemplary embodiments illustrated in the accompanying drawings, in which:

FIG. 1 shows a trigger unit with trigger line and sensors connected thereon in cascade according to the present subject matter; and FIGS. 2a to 2c show exemplary pulse diagrams over time for calibration of the trigger unit to the sensors from FIG. 1.

Embodiments will now be described with reference to the accompanying drawings.

DETAILED DESCRIPTION

According to FIG. 1, a trigger unit 1 is connected via a trigger line 2, composed of successive line portions 2a, 2b, 2c, . . . , to sensors 3a, 3b, 3c, . . . , generally 3, that can be triggered. The sensors 3 are in each case connected between two line portions 2a, 2b, 2c, . . . of the trigger line 2 and thus form a cascade formed of any number of sensors 3.

Each sensor 3 has an input 4 for one line portion and an output 5 for the other adjacent line portion 2a, 2b, 2c, . . . and has a controllable interrupter 6 between the input and output 4, 5 as well as a control circuit 7, which is connected to the input 4 and controls the interrupter 6.

In a calibration mode according to FIGS. 1 and 2a-2c, the interrupters 6 of all sensors 3 are initially open, as illustrated in FIG. 1. The control circuit 7 opens the interrupters 6 upon request, for example a regularly repeated automatic request by the trigger unit 1, for which purpose the trigger unit for example transmits a specific signal (not illustrated) via the trigger line 2 and the input 4 or an optional data bus 8 and a data bus connection 9 of the sensor 3; the interrupter 6 can also be opened manually at the factory or during installation, and, if desired, can also be closed permanently by the control circuit 7 after one-time calibration.

In the event of stepwise calibration in the calibration mode, the trigger unit 1 according to FIGS. 2a to 2c sends individual trigger pulses 10a, 10b, 10c, . . . generally 10, step-by-step via the trigger line 2, more specifically initially only the first trigger pulse 10a via the first line portion 2a of the trigger line 2, since all interrupters 6 are open, to the sensors 3, here initially only the first sensor 3a of the cascade. If, with open interrupter 6, a trigger pulse 10 is received at the input 4 at a sensor 3 in the calibration mode, the respective sensor 3 thus returns a response with the aid of its control circuit 7 to the trigger unit 1 and then closes the interrupter 6. The trigger unit 1 receives the response and can calibrate itself on the basis of the received response to the respective sensor 3, as will be explained hereinafter in greater detail.

If the interrupter 6 of a sensor 3 is closed, the sensor 3 thus does not respond to any further trigger pulse 10. For further calibration to further sensors 3, the trigger unit 1 transmits a further trigger pulse 10 for each further sensor 3 until the trigger unit 1 no longer receives a response to a trigger pulse 10; alternatively or additionally, a maximum number of trigger pulses 10 to be transmitted by the trigger unit 1 can be pre-set.

As a response, the sensor 3 in a first embodiment 3a according to the example of FIG. 2a easily reflects the trigger pulse 10a by means of a reflector as a reflected trigger pulse 10a' at the input 4. The reflector is formed in the simplest case by the interrupter 6 in the open state. The control circuit 7 then closes the interrupter 6 of the sensor 3a.

The trigger unit 1 measures the propagation time $t_1$ of the trigger pulse 10a, 10a' transmitted and then reflected by the sensor 3a and is calibrated thereto. The propagation time $t_1$ thus measured, which corresponds to a length $l_1$ of the trigger line 2 between the trigger unit 1 and the sensor 3a in question, here the length $l_1$ of the line portion 2a, can be taken into consideration subsequently in an operating mode in which the sensor 3a takes measurements with the aid of its sensor circuit $l_1$. In further steps of the calibration mode, the trigger unit 1 is calibrated on the basis of further propagation times $t_2$, $t_3$, . . . , generally $t_n$, or further cumulated line lengths $l_2$, $l_3$, . . . , generally ln, to further sensors 3b, 3c, . . . of the cascade until the trigger unit 1 no longer receives a response to a trigger pulse 10.

In addition to such a measurement of the propagation times $t_n$ or also alternatively, if a propagation time measurement is unnecessary or undesired, the sensors 3 and the order thereof on the trigger line 2 can be identified in the calibration mode. According to the example of FIG. 1, each sensor 3 for this purpose has an unambiguous identification ID, stored for example in a memory 12, and also has a modulator 13.

To this end, FIG. 2b shows an example of an embodiment in which the second sensor 3b of the cascade reflects a second trigger pulse 10b and modulates the reflected trigger pulse 10b' with its identification ID with the aid of the modulator 13. This can be repeated again stepwise for all sensors 3 on the trigger line 2. The trigger unit 1 thus identifies the order of the sensors 3 on the trigger line 2 on the basis of the sequence of the incoming identifications ID of the sensors 3 and can be calibrated thereto in addition to the propagation times $t_n$ or can be calibrated only thereto, alternatively to the propagation times $t_n$.

In the example in FIGS. 1 and 2b, the modulator 13 is formed as a closer 14 with an HF driver 15 controlled by the control circuit 7. The closer 14 is a reflector in this embodiment and short circuits to earth the trigger line 2, which is illustrated by way of example and which has a defined wave impedance; the trigger line 2 may have any structure of wave lines known in the art, for example may be a coaxial trigger line 2.

Here, the purpose of the closer 14 is to induce a deviation, controlled by the HF driver 15, from the defined wave impedance of the trigger line 2 and to induce a reflection thereon; for this purpose, it may form a short circuit to earth for example, as illustrated in FIG. 1. In this case, the interrupter 6 in the open state may, for example, be terminated with the wave impedance of the trigger line 2, such that there are no reflections on the interrupter 6 itself, which spares a separation from a reflection on the closer 14 itself. An interrupter 6 of this type is produced for example by an SPDT (single pole, double throw) changeover switch, in which a first connection is terminated with the wave impedance of the trigger line 2 and a second connection is connected to the output 5.

If the modulator 13 is to form an open circuit (not illustrated), the closer 14 could alternatively also be formed by the interrupter 6 controlled by the HF driver 15, and for example could be structured as an SPTT (single pole, triple throw) switch, of which the first connection forms the open circuit, of which the second connection is terminated with the wave impedance of the trigger line 2, and of which the third connection is connected to the output 5.

SPDT and SPTT switches can be produced here in high-frequency semiconductor circuit engineering.

The identification ID is fixedly incorporated, for example programmed, into each sensor 3 in the example of FIG. 1 by means of its memory 12; the memory 12 could also alternatively be inserted into the sensor 3 as an exchangeable module separate from the sensor 3 in the manner of a SIM card.

In the example of FIG. 2b the identification ID is coded as a 4-bit identification with a prefixed startbit 16, but could also have any other code length and coding. The reflected trigger pulse 10b', instead of being amplitude-modulated, could also be frequency-or phase-modulated and/or could have an additional stopbit.

The third sensor 3c of the cascade used for a third embodiment according to FIG. 2c may return its identification ID in the calibration mode in the form of a modulated identification pulse 17 as a sole response or following the reflected trigger pulse 10c'. The calibration may again take place gradually in this way for all sensors 3 on the trigger line 2. In this case too, the trigger unit 1 identifies the order of the sensors 3 on the trigger line 2 on the basis of the sequence of the incoming identifications ID of each sensor 3 and is calibrated thereto, either alone or additionally.

The identification pulse 17 can be provided for this purpose, as has been described further above with respect to the reflected trigger pulse 10b', with a startbit 16 and can be coded with 4-bit length, or can be composed differently and is likewise generated by the modulator 13.

The modulator 13 is supplied with energy in this exemplary embodiment either separately, for example via an external feed (not illustrated), wherein the signal power of the identification pulse 17 can be adapted and therefore any line losses can also be increased for compensation; or the energy necessary to form and transmit the identification pulse is taken from the trigger pulse 10c itself, for which purpose the sensor 3c may have an energy store, for example a capacitor (not illustrated). If the modulator 13 is supplied with energy separately, the trigger pulse 10c may therefore be very short, as shown in FIG. 2c; if, by contrast, the energy for the identification pulse 17 is to be taken from the trigger pulse 10c, this is therefore of correspondingly longer duration and/or is more powerful.

Alternatively, the control circuit 7 of a sensor 3 in accordance with a fourth embodiment (not illustrated) may also be configured, following the reflected trigger pulse 10' or instead of such a pulse, to output the identification ID for calibration of the trigger unit 1 at the data bus connection 9 and to thus return said identification via the data bus 8 to the trigger unit 1. The trigger unit 1 again identifies the order of the sensors 3 on the trigger line 2 stepwise on the basis of the sequence of the incoming identifications ID of each sensor 3.

Of course, all sensors 3 of the cascade may be designed in the same form, and the trigger unit 1 can thus calibrate itself to all sensors 3 similarly; alternatively, sensors 3 of different embodiments 3a-3c according to FIG. 1 can be combined in a single cascade, and the trigger unit 1 can be calibrated in accordance with the variants shown in FIGS. 2a-2c or the variant of the identification of the sensors 3 via the data bus 8.

In the operating mode, which can generally be activated after the calibration, the sensor circuit 11 of each sensor 3 is triggered as necessary by the trigger unit 1 via the trigger line 2, and a measuring procedure of the sensor 3 or sensor circuit 11 thereof is thus activated. The control circuit 7 and the sensor circuit 11 can receive possible adjustment values here via the database 8 and the database connection 9 and/or the sensor circuit 11 can output ascertained measured values in the same way.

The sensor circuit 11 of the example of FIG. 1 comprises a radar transmitter and/or receiver 11', however the sensors 3 and the method are not limited to radar sensors, but can also be applied similarly with other sensor technologies.

Here, the sensor circuit 11 can be permanently connected to the input 4 and thus receive the trigger pulse 10 transmitted in the operating mode from the trigger unit 1 via the trigger line 2. By contrast, in the example of FIG. 1, the control circuit 7 is configured, in the operating mode, to apply the trigger pulse 10 received at the input 4 to the sensor circuit 11 with the aid of a controlled trigger switch 18, if a measuring procedure of the sensor circuit 11 of the sensor 3 is to be triggered. The interrupters 6 of the sensors 3 connected in cascade are generally closed here in order to keep all sensors of the cascade ready for operation in the operating mode.

CONCLUSION

The invention is not limited to the presented embodiments, but comprises all variants, modifications and combinations of the presented measures which fall within the scope of the accompanying claims.

What is claimed is:

1. A method for calibrating a trigger unit which is connected via a trigger line to at least two sensors configured to be triggered, each sensor being connected between two successive line portions of the trigger line, wherein each sensor has an input for one line portion and an output for the other line portion, a controllable interrupter between the input and the output, and a control circuit which is connected to the input and controls the interrupter, wherein the interrupters of all sensors are initially open, said method comprising the following steps:
   transmitting a trigger pulse from the trigger unit via at least one line portion to a sensor;
   in the sensor: receiving the trigger pulse and, if the interrupter is open, returning a response to the trigger unit and closing the interrupter;
   in the trigger unit: receiving the response and calibrating the trigger unit to the sensor using the received response;
   repeating the aforementioned steps for each further sensor until the trigger unit no longer receives a response to a trigger pulse or a maximum pre-set number of transmitted trigger pulses has been reached;
   wherein each sensor, as a response, reflects the trigger pulse, and the trigger unit measures the propagation times of the trigger pulses transmitted and then reflected by the respective sensors and is calibrated thereto.

2. The method according to claim 1, wherein each sensor has an unambiguous identification and modulates the reflected trigger pulse with its identification, and the trigger unit identifies an order of the sensors on the trigger line using a sequence of incoming identifications and is calibrated thereto.

3. The method according to claim 1, wherein each sensor has an unambiguous identification and, following the reflected trigger pulse, also returns an identification pulse modulated with its identification, and the trigger unit identifies an order of the sensors on the trigger line using a sequence of incoming identifications and is calibrated thereto.

4. The method according to claim 1, wherein each sensor has an unambiguous identification and, following the reflected trigger pulse, also returns the identification via a data bus to the trigger unit, and the trigger unit identifies an order of the sensors on the trigger line using a sequence of incoming identifications and is also calibrated thereto.

5. A cascadable sensor, configured to be connected via an input and an output between two line portions of a trigger line, said sensor comprising:
   a sensor circuit configured to be triggered, a controllable interrupter between the input and output, and a control circuit which is connected to the input and controls the interrupter;
   wherein the control circuit is configured
      in a calibration mode: to initially open the interrupter and, after receiving a first trigger pulse at the input, to output a response at the input and to close the interrupter, and
      in an operating mode: to apply a trigger pulse, received at the input, to the sensor circuit;
   wherein the sensor further comprises a memory with an unambiguous identification and a modulator connected to the input, and wherein the control circuit is configured, as a response in the calibration mode, to return an identification pulse modulated with the identification by means of the modulator.

6. The sensor according to claim 5, further comprising a reflector at the input, which reflector is configured to be switched by the control circuit, wherein the control circuit is configured, as a response in the calibration mode, to reflect the trigger impulse at the input.

7. The sensor according to claim 6, wherein the reflector is formed by the interrupter in the open state.

8. The sensor according to claim 6, further comprising a memory with an unambiguous identification and a modulator connected to the input, wherein the control circuit is configured to modulate the reflected trigger pulse with the identification by means of the modulator.

9. The sensor according to claim 6, further comprising a memory with an unambiguous identification and a modulator connected to the input, wherein the control circuit is configured, following the reflected trigger pulse, to also return an identification pulse modulated with the identification by means of the modulator.

10. The sensor according to claim 6, further comprising a memory with an unambiguous identification, wherein the control circuit is configured, following the reflected trigger pulse, to also output the identification at a data bus connection.

11. The sensor according to claim 5, wherein the sensor circuit is a radar sensor circuit.

* * * * *